(12) United States Patent
Kakikawa et al.

(10) Patent No.: US 9,388,322 B2
(45) Date of Patent: Jul. 12, 2016

(54) INK, INK CARTRIDGE AND INK JET RECORDING PROCESS

(71) Applicant: CANON KABUSHIKI KAISHA, Tokyo (JP)

(72) Inventors: Hiroshi Kakikawa, Fujisawa (JP); Kouhei Nakagawa, Kawasaki (JP); Yuhei Shimizu, Kawasaki (JP); Takakazu Mizutani, Kawasaki (JP); Hideki Takayama, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 13/904,212

(22) Filed: May 29, 2013

(65) Prior Publication Data

US 2013/0328973 A1 Dec. 12, 2013

(30) Foreign Application Priority Data

Jun. 6, 2012 (JP) ................. 2012-129095

(51) Int. Cl.
*C09D 11/38* (2014.01)
*C09D 11/322* (2014.01)

(52) U.S. Cl.
CPC .............. *C09D 11/38* (2013.01); *C09D 11/322* (2013.01)

(58) Field of Classification Search
None
See application file for complete search history.

(56) References Cited

U.S. PATENT DOCUMENTS

| | | | |
|---|---|---|---|
| 6,698,876 B2 | 3/2004 | Sato et al. | |
| 6,848,781 B2 | 2/2005 | Ogino et al. | |
| 6,874,881 B2 | 4/2005 | Shirota et al. | |
| 7,029,109 B2 | 4/2006 | Shirota et al. | |
| 7,055,943 B2 | 6/2006 | Suzuki et al. | |
| 7,144,452 B2 | 12/2006 | Takayama et al. | |
| 7,198,664 B2 | 4/2007 | Mafune et al. | |
| 7,198,665 B2 | 4/2007 | Nakamura et al. | |
| 7,247,196 B2 | 7/2007 | Sato et al. | |
| 7,291,361 B2 | 11/2007 | Ogino et al. | |
| 7,297,203 B2 * | 11/2007 | Takada .................... | C09B 29/33 106/31.72 |
| 7,381,257 B2 | 6/2008 | Takayama et al. | |
| 7,402,200 B2 * | 7/2008 | Imai ....................... | C09D 11/54 106/31.27 |
| 7,705,071 B2 | 4/2010 | Nakagawa et al. | |
| 7,767,735 B2 | 8/2010 | Koganehira | |
| 7,854,798 B2 | 12/2010 | Udagawa et al. | |
| 7,868,060 B2 | 1/2011 | Sakai et al. | |
| 7,909,449 B2 | 3/2011 | Sato et al. | |
| 8,425,027 B2 | 4/2013 | Nishiwaki et al. | |
| 2006/0098068 A1 * | 5/2006 | Hakamada ............. | C09D 11/40 347/100 |
| 2006/0103704 A1 * | 5/2006 | Hakamada ............. | B41J 2/2107 347/100 |
| 2007/0165086 A1 * | 7/2007 | Sekiguchi .............. | C09D 11/30 347/100 |
| 2007/0263032 A1 * | 11/2007 | Sekiguchi .............. | C09D 11/38 347/44 |
| 2009/0258145 A1 | 10/2009 | Mukae et al. | |
| 2012/0050383 A1 * | 3/2012 | Takayama et al. ............. | 347/20 |
| 2012/0050386 A1 | 3/2012 | Shimizu et al. | |
| 2012/0050387 A1 | 3/2012 | Nakata et al. | |
| 2013/0063533 A1 | 3/2013 | Yamamoto et al. | |

FOREIGN PATENT DOCUMENTS

| | | |
|---|---|---|
| EP | 0 551 913 A1 | 7/1993 |
| EP | 2 423 275 A1 | 2/2012 |
| JP | 2005-082663 A | 3/2005 |
| JP | 2006-070123 A | 3/2006 |
| JP | 2009-007556 A | 1/2009 |
| JP | 2010-018741 A | 1/2010 |

OTHER PUBLICATIONS

Sep. 4, 2013 European Search Report in European Patent Appln. No. 13002785.7.

* cited by examiner

*Primary Examiner* — An Do
*Assistant Examiner* — Renee I Wilson
(74) *Attorney, Agent, or Firm* — Fitzpatrick, Cella, Harper & Scinto

(57) ABSTRACT

The invention provides an ink for use in an ink jet recording process in which an ink is ejected from a recording head by the action of thermal energy, the ink comprising a pigment, a water-soluble polyurethane polymer, a compound represented by a general formula (1) having a weight-average molecular weight of 1,000 or more and 8,500 or less, and a polyethylene oxide alkyl ether, the alkyl group of which has 12 or more carbon atoms, General formula (1)

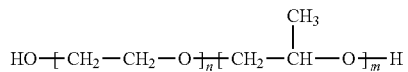

wherein, based on the total mass of the ink, the content (mass %) of the compound represented by the general formula (1) is 0.4 times or more and 10.0 times or less in terms of mass ratio with respect to the content (mass %) of the polyethylene oxide alkyl ether.

18 Claims, No Drawings

INK, INK CARTRIDGE AND INK JET RECORDING PROCESS

BACKGROUND OF THE INVENTION

1. Field of the Invention

The present invention relates to an ink, and an ink cartridge and an ink jet recording process using such an ink.

2. Description of the Related Art

An image recorded with an ink containing a pigment involves a problem that its glossiness is low. In order to solve this problem, an ink further containing a water-soluble polyurethane polymer in addition to the pigment has been investigated (Japanese Patent Application Laid-Open No. 2006-070123, Patent Literature 1).

In addition, an ink containing an ethylene oxide-propylene oxide type surfactant (EO-PO type surfactant) has been investigated for improving the glossiness (Japanese Patent Application Laid-Open No. 2005-082663, Patent Literature 2). The ink containing the EO-PO type surfactant has also been investigated in Japanese Patent Application Laid-Open No. 2009-007556 (Patent Literature 3) and Japanese Patent Application Laid-Open No. 2010-018741 (Patent Literature 4). Patent Literature 2 describes that an ink containing an EO-PO type surfactant having a weight-average molecular weight less than 1,000 can improve the glossiness of an image. Patent Literature 3 describes that an ink containing an EO-PO type surfactant having specific acid value and weight-average molecular weight and a polymer can improve the scratch resistance of an image and the ejection stability of the ink at the same time. Patent Literature 4 describes that an EO-PO type surfactant having a weight-average molecular weight of 15,000 or more is caused to be contained as a stabilizer in an ink, thereby improving the storage stability and ejection stability of the ink.

SUMMARY OF THE INVENTION

According to an investigation by the present inventors, the glossiness of the resulting image has been improved by the ink described in Patent Literature 1, while there has still been room for improvement. In addition, when the ink has been used in an ink jet recording process in which an ink is ejected from a recording head by causing thermal energy to act on the ink, the ejection stability of the ink has been low. Thus, an investigation has been made by adding an EO-PO type surfactant to the ink with reference to Patent Literatures 2 to 4 for the purpose of improving the glossiness of the image and the ejection stability of the ink. However, none of the performances has been sufficient. In addition, the optical density of the resulting image has also been low.

Accordingly, it is an object of the present invention to provide an ink which has high ejection stability even when the ink is used in an ink jet recording process in which an ink is ejected from a recording head by the action of thermal energy, and which provides high glossiness and high optical density of a resulting image. Another object of the present invention is to provide an ink cartridge and an ink jet recording process using the ink according to the present invention.

The above objects can be achieved by the present invention described below. That is, the ink according to the present invention is an ink for use in an ink jet recording process in which an ink is ejected from a recording head by the action of thermal energy, comprising a pigment, a water-soluble polyurethane polymer, a compound represented by the following general formula (1) having a weight-average molecular weight of 1,000 or more and 8,500 or less, and a polyethylene oxide alkyl ether the alkyl group of which has 12 or more carbon atoms, wherein based on the total mass of the ink the content (mass %) of the compound represented by the general formula (1) is 0.4 times or more and 10.0 times or less in terms of mass ratio with respect to the content (mass %) of the polyethylene oxide alkyl ether, General formula (1)

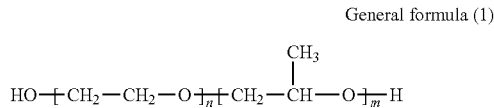

wherein n/(n+m) is 0.15 or more and 0.85 or less.

According to the present invention, there can be provided an ink which has high ejection stability, and which provides high glossiness and high optical density of a resulting image. In addition, according to another embodiment of the present invention, there can be provided an ink cartridge and an ink jet recording method using the above-described ink.

Further features of the present invention will become apparent from the following description of exemplary embodiments.

DESCRIPTION OF THE EMBODIMENTS

Preferred embodiments of the present invention will now be described in detail. The present inventors have first investigated the cause of the low ejection stability of a conventional ink containing a pigment and a water-soluble polyurethane polymer (hereinafter may also be referred to as "polyurethane polymer" merely) like that of Patent Literature 1. Details thereof are shown below.

According to the investigation by the present inventors, a phenomenon that a polymer component in an ink sticks to a face on which an ejection orifice of a recording head is formed (face wetting) occurs when the conventional ink containing the pigment and the water-soluble polyurethane polymer is ejected according to the ink jet recording process. This phenomenon is considered to be caused by hydrophobic interaction between the face and the polymer. Such sticking of the polymer to the face also occurs in an acrylic polymer or the like. However, the water-soluble polyurethane polymer has a hydrophobic portion in plenty and forms a high-energy surface when sticking once, and so the ink is liable to wet and spread on the face. The face wetting thus occurs more markedly than the acrylic polymer. At this time, a flying direction of an ink droplet ejected deviates from an intended direction by influence of the water-soluble polyurethane polymer sticking to the face. This deviation is small right after the ink droplet is ejected, but increases until the droplet reaches a recording medium and is recognized as a problem such as misalignment of a part of dots in an image. A further investigation by the present inventors has revealed that when the ink is used in the ink jet recording process in which the ink is ejected from the recording head by the action of thermal energy, the viscosity of the ink is lowered by heating, so that the sticking of the polymer to the face particularly markedly occurs to markedly lower the ejection stability of the ink.

As described above, the face wetting by the polymer is caused by the hydrophobic interaction between the face and the polymer. Accordingly, the present inventors have considered that it is important to weaken the hydrophobicity of the polymer and have carried out another investigation by adding such a surfactant as generally used heretofore in ink to the ink containing the water-soluble polyurethane polymer. However, the face wetting has not been improved, and there has still been room for improvement in the ejection stability of the ink. This is considered to be attributable to the following reason. In a general surfactant, a hydrophobic portion and a hydrophilic portion are clearly divided, and so the surfactant exhibit high surface activity. Therefore, the surfactant can be adsorbed on the polyurethane polymer by the hydrophobic interaction between the hydrophobic portion of the surfactant and the hydrophobic portion of the polyurethane polymer. However, the general surfactant is easy to be oriented to a gas-liquid interface or a solid-liquid interface by the high surface activity thereof even in a state where the surfactant has been adsorbed on the polyurethane polymer. As a result, the polyurethane polymer comes to be present in plenty in the neighborhood of an ejection orifice having a gas-liquid interface. In addition, since the hydrophobicity of the surfactant itself is strong, the sticking to the face cannot be inhibited even when being adsorbed on the polyurethane polymer, so that the face wetting occurs like a case where no surfactant is contained or more markedly than such case.

Thus, the present inventors have carried out a further investigation by using a surfactant weak in surface active action. Specifically, the investigation has been made by using an ethylene oxide-propylene oxide type surfactant. The EO-PO type surfactant exhibits a surface active action because it has an ethylene oxide structure ($CH_2CH_2O$) high in hydrophilicity and a propylene oxide structure ($CH_2CH(CH_3)O$) low in hydrophilicity, but its hydrophilic portion and hydrophobic portion are not divided as clearly as the general surfactant. Accordingly, the surface active action thereof is weaker than the general surfactant. Such an EO-PO type surfactant has been added to an ink containing a water-soluble polyurethane polymer to make the investigation. However, the face wetting has not been improved, and the ejection stability of the ink has been insufficient. This is considered to be attributable to the following reason. Since the amount of the EO-PO type surfactant adsorbed on the polyurethane polymer is small, the hydrophobicity of the polyurethane polymer is not weakened, so that the hydrophobic interaction between the polyurethane polymer and the face cannot be inhibited.

In view of these results, the present inventors have carried out a further investigation. As a result, the constitution of the present invention has been reached. Details thereof are shown below.

A polyethylene oxide alkyl ether the alkyl group of which has 12 or more carbon atoms is a surfactant whose hydrophilic portion and hydrophobic portion are clearly divided. Accordingly, when the polyethylene oxide alkyl ether is added to an ink containing a polyurethane polymer, this surfactant is present in a state of being adsorbed on the polyurethane polymer as described above. When an EO-PO type surfactant represented by the general formula (1) is further added to such an ink, the EO-PO type surfactant can be present in a state of being adsorbed on the polyethylene oxide alkyl ether adsorbed on the polyurethane polymer. This is because affinity between the ethylene oxide structure of the EO-PO type surfactant and the ethylene oxide structure of the polyethylene oxide alkyl ether is very high. Since the hydrophobicity of the polyurethane polymer is weakened by the EO-PO type surfactant adsorbed in this manner, the hydrophobic interaction between the face and the polyurethane polymer become weak, so that the face wetting is considered to be inhibited.

In addition, an investigation by the present inventors has revealed that the polyethylene oxide alkyl ether the alkyl group of which has 12 or more carbon atoms and the EO-PO type surfactant represented by the general formula (1) are used in combination, whereby the glossiness and optical density of the resulting image can be improved at a high level in addition to the inhibition of the face wetting and the improvement in the ejection stability of the ink. The reason for this is shown below.

In order to obtain an image with high glossiness, it is important to improve the surface smoothness of the image. In order to obtain an image having high optical density on the other hand, it is important to cause a pigment to be present on the surface of a recording medium. According to the ink containing the pigment and the water-soluble polyurethane polymer like Patent Literature 1, the surface smoothness of the image is improved compared with a case where no polyurethane polymer is contained. This is because the polyurethane polymer in the ink applied to the surface of the recording medium forms a film. However, this film forming property of the polyurethane polymer greatly depends on the softening point of the polymer and temperature conditions. Accordingly, an irregular surface may be present partly in some cases according to recording conditions to fail to obtain an image having sufficiently high glossiness. In such a case, a method of raising the waster solubility of the polymer is generally taken. When the water solubility of the polymer is raised, the polymer is apt to hold a molecule of water therein in the recording medium, and the fixing time of the ink becomes long, so that the compatibility of the polymer is improved. However, the polymer is liable to penetrate into the recording medium, so that the effect to improve the surface smoothness of the image is not achieved, and the glossiness of the image is hence not improved. In addition, since the pigment is also liable to penetrate together with the polymer into the recording medium, the optical density of the image is also lowered.

However, it has been found that when the polyethylene oxide alkyl ether the alkyl group of which has or more carbon atoms and the EO-PO type surfactant represented by the general formula (1) are used in combination like the present invention, the polymer is hard to penetrate into the recording medium even when the hydrophilicity of the polymer is improved, and so the glossiness and optical density of the resulting image can be improved at the same time at a high level. This is considered to be by the following mechanism. The ethylene oxide structures of the two kinds of surfactants adsorbed on the polyurethane polymer undergo hydrogen bonding to a molecule of water, whereby the hydrophilicity of the polymer is improved, so that the fixing time of the ink becomes long, and the compatibility of the polymer is easily improved. In addition, the polyurethane polymer is aggregated in the recording medium by hydrophobic interaction between the surfactants, so that the polymer is hard to penetrate into the recording medium. Therefore, the surface smoothness of the image is improved to improve the glossiness of the image. Further, the pigment tends to be present on the surface of the recording medium owing to the polyurethane polymer aggregated, so that the optical density of the image is also improved. In this manner, the glossiness and optical density of the image can be improved at the same time at a high level.

An investigation by the present inventors has revealed that the effect to improve the ejection stability of the ink and the effect to improve the glossiness and optical density of the image at the same time at a high level are achieved only when the EO-PO type surfactant represented by the general formula (1) and the polyethylene oxide alkyl ether the alkyl group of which has 12 or more carbon atoms are caused to be contained at a specified mass ratio in the ink. Specifically, based on the total mass of the ink the content (mass %) of the compound represented by the general formula (1) is required to be 0.4 times or more and 10.0 times or less in terms of mass ratio with respect to the content (mass %) of the polyethylene oxide alkyl ether the alkyl group of which has 12 or more carbon atoms. If the mass ratio is less than 0.4 times, the content of the compound represented by the general formula (1) is too low to inhibit the face wetting, so that the ejection stability of the ink is lowered. If the mass ratio is more than 10.0 times on the other hand, the amount of the compound represented by the general formula (1) which is not adsorbed on the polyethylene oxide alkyl ether becomes large, so that the aggregation of the polyurethane polymer by the hydrophobic interaction between the surfactants is hard to occur, and the effect to improve the glossiness and optical density of the image is not achieved.

As described above, the number of carbon atoms of the alkyl group that the polyethylene oxide alkyl ether has is required to be 12 or more in the present invention. If the number of carbon atoms of the alkyl group is less than 12, such a surfactant is hard to be adsorbed on the polyurethane polymer because of its weak surface active action, so that the effect to inhibit the face wetting and the effect to improve the glossiness and optical density of the image are not achieved.

In addition, in the EO-PO type surfactant represented by the general formula (1), n (the number of ethylene oxide structures) and m (the number of propylene oxide structures) in the general formula (1) are required to satisfy the relationship that n/(n+m) is 0.15 or more and 0.85 or less. If n/(n+m) does not satisfy the above range, such a surfactant is hard to be adsorbed on the polyethylene oxide alkyl ether because the hydrophilic-hydrophobic balance thereof is broken, so that the effect to inhibit the face wetting is not achieved.

In addition, the EO-PO type surfactant represented by the general formula (1) is required to have a weight-average molecular weight of 1,000 or more and 8,500 or less in terms of polystyrene as determined by gel permeation chromatography (GPC). If the weight-average molecular weight is less than 1,000, such a surfactant is hard to be adsorbed on the polyethylene oxide alkyl ether because its molecular size is small, and the hydrophilicity thereof becomes high, so that the effect to inhibit the face wetting is not achieved. If the weight-average molecular weight is more than 8,500 on the other hand, such a surfactant is hard to be adsorbed on the polyethylene oxide alkyl ether because the excluded volume effect thereof becomes large, so that the effect to inhibit the face wetting is not achieved.

The respective components synergistically exert en effect on one another like the above-described mechanism, whereby the effects of the present invention can be achieved.

Ink:

The respective components constituting the ink according to the present invention will hereinafter be respectively described.

Pigment

The ink according to the present invention contains a pigment. The content (mass %) of the pigment is favorably 0.1 mass % or more and 15.0 mass % or less, more favorably 1.0 mass % or more and 10.0 mass % or less based on the total mass of the ink.

In the present invention, examples of the pigment in terms of a dispersing method thereof include polymer-dispersed type pigments using a polymer as a dispersant (polymer-dispersed pigments using a polymer dispersant, microcapsule pigments with the surface of a pigment particle covered with a polymer, and polymer-bonded pigments with an organic group containing a polymer chemically bonded to the surface of a pigment particle), and self-dispersible type pigments (self-dispersible pigments) with a hydrophilic group introduced into the surface of a pigment particle. Needless to say, plural kinds of pigments different in dispersing method may also be used in combination. Any conventionally known pigment may be used as the pigment. Among others, carbon black or an organic pigment is favorably used. One kind of pigment may be used, or two or more kinds of pigment may be used in combination. When the pigment used in the ink is the polymer-dispersed type pigment, a polymer is used as a dispersant. The polymer used as the dispersant favorably has both hydrophilic portion and hydrophobic portion. Specific example thereof include acrylic polymers obtained by polymerizing a monomer having a carboxyl group, such as acrylic acid or methacrylic acid, and a monomer having an aromatic group, such as styrene. The acid value of the polymer used as the dispersant in the present invention is favorably 50 mg KOH/g or more and 300 mg KOH/g or less. The weight-average molecular weight (Mw), in terms of polystyrene, of the polymer used as the dispersant as determined by GPC is favorably 1,000 or more and 15,000 or less. The content (mass %) of the polymer dispersant in the ink is favorably 0.1 mass % or more and 10.0 mass % or less, more favorably 0.2 mass % or more and 4.0 mass % or less based on the total mass of the ink. In addition, the content (mass %) of the polymer dispersant is favorably 0.1 times or more and 1.0 times or less in terms of mass ratio with respect to the content (mass %) of the pigment.

Water-Soluble Polyurethane Polymer

The ink according to the present invention contains a water-soluble polyurethane polymer. In the present invention, "water-soluble polymer" means a polymer which can be dissolved in an aqueous medium that is water or a mixed solvent of water and a water-soluble organic solvent, and is present in a state of having no particle size. More specifically, a polymer which has a volume-average particle size less than 30 nm or whose volume-average particle size cannot be measured is judged to be "water-soluble polymer". Incidentally, the volume-average particle size is a volume-average particle size determined by subjecting an aqueous solution containing the polymer and being 50-times diluted (by volume) with pure water to measurement under measuring conditions of Set-Zero: 30 s, number of measurements: 3 times, measuring time: 180 seconds and refractive index: 1.5 using UPA-EX150 (manufactured by NIKKISO).

In the present invention, the content (mass %) of the polyurethane polymer is favorably 0.1 mass % or more and 10.0 mass % or less based on the total mass of the ink. In addition, the content (mass %) of the polyurethane polymer in the ink is favorably 0.03 times or more and 1.00 times or less in terms of mass ratio with respect to the content (mass %) of the pigment based on the total mass of the ink.

In the present invention, the acid value of the polyurethane polymer is favorably 10 mg KOH/g or more and 110 mg KOH/g or less. In the present invention, the acid value of the polyurethane polymer was measured by dissolving the polymer in THF and subjecting the resultant solution to potentiometric titration with an ethanol solution titrant of potassium hydroxide by means of a potentiometric automatic titrator AT510 (manufactured by KYOTO ELECTRONICS MANUFACTURING CO., LTD.).

In the ink according to the present invention, the weight-average molecular weight (Mw) of the polyurethane polymer as determined by GPC is favorably 5,000 or more and 100,000 or less, more favorably 5,000 or more and 15,000 or less in terms of polystyrene. In the present invention, the average molecular weight of the polyurethane polymer can be measured by GPC. In the present invention, the measurement by GPC was conducted by using an apparatus: Alliance GPC 2695 (manufactured by Waters), a column: 4-series column of Shodex KF-806M (manufactured by Showa Denko) and a detector: RI (refractive index) to calculate the average molecular weight by using PS-1 and PS-2 (products of Polymer Laboratories) as polystyrene standard samples.

In the present invention, any compound may be used as the water-soluble polyurethane polymer so far as the compound is one obtained by reacting a polyisocyanate that is a compound having two or more isocyanate groups and a polyol compound that is a compound having two or more hydroxyl groups.

Specific examples of a polyisocyanate usable in the present invention include aliphatic polyisocyanates, alicyclic polyisocyanates, aromatic polyisocyanates and aromatic-aliphatic polyisocyanates. Examples of a polyol usable in the present invention include polyester polymers using a polyester polyol, polyether polymers using a polyether polyol, polycarbonate polymers using a polycarbonate diol and other polymers using a polyol having no acid group (for example, polyhydroxypolyacetal, polyhydroxypolyacrylate, polyhydroxypolyester amide and polyhydroxypolythioether).

Upon synthesis of the water-soluble polyurethane polymer, a diol compound having an acid group and a chain extender may also be used in addition to the above-described polyisocyanate compound and polyol compound. Examples of the diol having the acid group include dimethylolacetic acid, dimethylolpropionic acid and dimethylolbutanoic acid. These compounds may be used either singly or in any combination thereof as needed.

Examples of the chain extender include polyvalent amines such as dimethylolethylamine, ethylenediamine and diethylenetriamine, polyvalent imines such as polyethylene-polyimine, and polyhydric alcohols such as neopentyl glycol and butylethylpropanediol. These chain extenders may be used either singly or in any combination thereof as needed. In the present invention, a polyhydric alcohol among the chain extenders is favorably used from the viewpoint of the glossiness of the image. In particular, a water-soluble polyurethane polymer synthesized by using neopentyl glycol as the chain extender, that is, a water-soluble polyurethane polymer having a unit derived from neopentyl glycol is more favorably used. The reason for this is that the polymer easily aggregates because the polyhydric alcohol does not have a cationic group unlike the polyvalent amine or polyvalent imine.

Compound represented by the general formula (1) having a weight-average molecular weight of 1,000 or more and 8,500 or less The ink according to the present invention contains a compound represented by the following general formula (1) and having a weight-average molecular weight of 1,000 or more and 8,500 or less.

General formula (1)

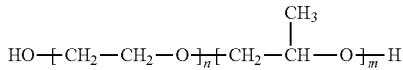

In the general formula (1), n/(n+m) is 0.15 or more and 0.85 or less. Further, n/(n+m) is favorably 0.16 or more and 0.83 or less. n is favorably 3 or more and 38 or less. m is favorably 16 or more and 56 or less. In the compound represented by the general formula (1), the ethylene oxide structure and the propylene oxide structure may be either a random copolymer or block copolymer. In the present invention, the compound is favorably a block copolymer of the ethylene oxide structure and the propylene oxide structure. Further, the compound is more favorably an ABA type block copolymer of the order of the ethylene oxide structure, the propylene oxide structure and the ethylene oxide structure like a compound represented by the following general formula (2).

General formula (2)

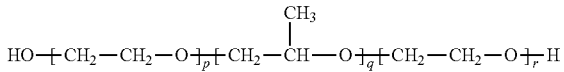

In the general formula (2), (p+r)/(p+q+r) is 0.15 or more and 0.85 or less. p+r is favorably 3 or more and 56 or less, more favorably 3 or more and 27 or less. q is favorably 16 or more and 56 or less, more favorably 16 or more and 36 or less.

As the compound represented by the general formula (1), may be used a commercially available product such as EMALEX DAPE-0203, 0205, 0207, 0210, 0212, 0215 or 0220 (product of Nihon-Emulsion), EMALEX 510 (product of Nihon-Emulsion), FINESURF 560 (product of AOKI OIL), or ADEKA PLURONIC: L31, L34, L61, L62, L64, L71, L72, L101, P103 or F68 (product of ADEKA). Among these, L31, L34, L61, L62, L64, L71, L72, L101, P103 and F68 are compounds represented by the general formula (2).

In the present invention, the content (mass %) of the compound represented by the general formula (1) in the ink is favorably 0.35 mass % or more and 1.00 mass % or less based on the total mass of the ink. If the content is less than 0.35 mass %, the effect to improve the ejection stability of the ink may not be sufficiently achieved in some cases. If the content is more than 1.00 mass %, the effect to improve the glossiness of the image may not be sufficiently achieved in some cases.

The content (mass %) of the compound represented by the general formula (1) based on the total mass of the ink is favorably 0.2 times or more and 10.0 times or less in terms of mass ratio with respect to the content (mass %) of the water-soluble polyurethane polymer. If the mass ratio is less than 0.2 times, the effect to improve the ejection stability of the ink may not be sufficiently achieved in some cases. If the mass ratio is more than 10.0 times, the effect to improve the glossiness and optical density of the image may not be sufficiently achieved in some cases.

Polyethylene oxide alkyl ether the alkyl group of which has 12 or more carbon atoms The ink according to the present invention contains a polyethylene oxide alkyl ether the alkyl group of which has 12 or more carbon atoms. In the present invention, the polyoxyethylene alkyl ether has a structure represented by a general formula (3): R—O—(CH$_2$CH$_2$O)$_x$H in which R is a hydrocarbon group having 12 or more carbon atoms. Examples of R include lauryl, cetyl, stearyl, oleyl and behenyl groups. R is more favorably an alkyl group having 12 to 22 carbon atoms. Further, R is particularly favorably an alkyl group having 12 to 18 carbon atoms. If the number of carbon atoms of the alkyl group of the polyethylene oxide alkyl ether is more than 18, the hydrophobicity of such a compound becomes strong, and the effect to improve the glossiness and optical density of an image may not be sufficiently achieved in some cases. In the general formula (3), x is favorably 10 or more and 50 or less, more favorably 10 or more and 40 or less.

The HLB value of the polyethylene oxide alkyl ether as determined by the Griffin's method is favorably 15.0 or more. If the HLB value is less than 15.0, the effect to improve the glossiness and optical density of the image may not be sufficiently achieved in some cases. The upper limit of the HLB value as determined by the Griffin's method is 20.0. Incidentally, in the present invention, the HLB value is determined by the Griffin's method. The Griffin's method is a method for determining an HLB value from the formula weight of a hydrophilic group of a surfactant and the molecular weight of the surfactant according to the equation, HLB value=20×(Formula weight of the hydrophilic group of the surfactant)/(Molecular weight of the surfactant).

Aqueous Medium

The ink according to the present invention may use an aqueous medium that is water or a mixed solvent of water and a water-soluble organic solvent. The content (mass %) of the water-soluble organic solvent in the ink is favorably 3.0 mass % or more and 50.0 mass % or less based on the total mass of the ink. All of water-soluble organic solvents heretofore generally used may be used as the water-soluble organic solvent. Examples thereof include alcohols, glycols, alkylene glycols the alkylene group of which has 2 to 6 carbon atoms, polyethylene glycols, nitrogen-containing compounds and sulfur-containing compounds. These water-soluble organic solvents may be used either singly or in any combination thereof as needed. Deionized water (ion-exchanged water) is favorably used as water. The content (mass %) of water in the ink is favorably 50.0 mass % or more and 95.0 mass % or less based on the total mass of the ink.

Other Components

The ink according to the present invention may also contain a water-soluble organic compound that is solid at ordinary temperature, such as a polyhydric alcohol such as trimethylolpropane or trimethylolethane, urea, or a urea derivative such as ethyleneurea in addition to the above-described components, as needed. Further, the ink according to the present invention may also contain various additives such as another surfactant than the compound represented by the general formula (1) or the polyethylene oxide alkyl ether, a pH adjustor, a rust preventive, a preservative, a mildew-proofing agent, an antioxidant, an anti-reducing agent, an evaporation accelerator, a chelating agent, another polymer than the water-soluble polyurethane polymer, as needed.

Ink Cartridge:

The ink cartridge according to the present invention has an ink storage portion storing an ink, and the above-described ink according to the present invention is stored in the ink storage portion. The structure of the ink cartridge includes such a structure that the ink storage portion is formed by an ink storage chamber storing a liquid ink and a negative pressure generating member storage chamber storing a negative pressure generating member for holding the ink in the interior thereof by a negative pressure. The ink storage portion of the ink cartridge may also be so constructed that the whole amount of the ink stored is held in the negative pressure generating member without providing the ink storage chamber storing the liquid ink. In addition, the ink cartridge may be constructed so as to have an ink storage portion and a recording head.

Ink Jet Recording Process:

The ink jet recording process according to the present invention is an ink jet recording process in which thermal energy is caused to act on an ink to eject the ink from a recording head, and the above-described ink according to the present invention is used. Incidentally, "recording" in the present invention include a mode of conducting recording on a recording medium with the ink according to the present invention and a mode of conducting printing on a non-permeable base material such as glass, plastic or film with the ink according to the present invention. Examples of the recording medium include plain paper as well as what is called glossy paper with a porous ink receiving layer containing an inorganic pigment and a binder provided on a gas-permeable support (for example, paper).

The present invention will hereinafter be described in more detail by the following Examples and Comparative Examples. However, the present invention is not limited by the following examples unless going beyond the gist of the present invention. Incidentally, all designations of "part" or "parts" described in the following examples are based on mass unless expressly noted.

Preparation of Pigment Dispersion:

A acrylic polymer (trade name: JONCRYL 678; product of BASF) having an acid value of 215 mg KOH/g and a weight-average molecular weight of 8,500 was neutralized with 0.95 mass % of potassium hydroxide to prepare an aqueous polymer dispersant solution having a polymer content of 20.0 mass %. 10 parts of carbon black (trade name: Black Pearls 880, product of Cabot), 25.0 parts of the aqueous polymer dispersant solution and 65.0 parts of water were then placed in a bead mill (trade name: LMZ2, manufactured by Ashizawa Finetec) in which the packing rate of zirconia beads having a diameter of 0.3 mm was set to 80%, and dispersed for 5 hours at the number of revolutions of 1,800 rpm. Thereafter, the resultant dispersion was centrifuged for 30 minutes at the number of revolutions of 5,000 rpm, thereby removing an aggregated component, and further diluted with ion-exchanged water to prepare a pigment dispersion having a pigment content of 10.0 mass % and a polymer content of 5.0 mass %.

Preparation of Aqueous Water-Soluble Polyurethane Polymer Solution:

Preparation of Aqueous Water-Soluble Polyurethane Polymer Solution PU-1

50.3 parts of polytetramethylene glycol having a number-average molecular weight of 2,000 was added into methyl ethyl ketone, and the contents were sufficiently stirred to dissolve it. Then, 33.5 parts of isophorone diisocyanate and 14.3 parts of dimethylolpropionic acid were added to this solution to conduct a reaction for 1 hour at 75° C., thereby obtaining a solution containing a prepolymer. The resultant solution was cooled to 60° C., and an aqueous potassium hydroxide solution was added, thereby neutralizing the carboxyl group of the prepolymer. After the solution was then cooled to 40° C., ion-exchanged water was added, and the solution was stirred at high speed by a homomixer, thereby emulsifying the solution. Thereafter, 1.9 parts of neopentyl glycol (chain extender) was added to conduct a chain extension reaction of the prepolymer for 12 hours at 30° C. Methyl ethyl ketone was distilled out of the solution by heating under reduced pressure at the time the presence of an isocyanate group had not been identified by FT-IR. In this manner, an aqueous water-soluble polyurethane polymer solution PU-1 (acid value: 60 mg KOH/g, weight-average molecular weight: 10,000) in which the content of the polymer was 20.0% was obtained.

Preparation of Aqueous Water-Soluble Polyurethane Polymer Solution PU-2

50.7 parts of polytetramethylene glycol having a number-average molecular weight of 2,000 was added into methyl ethyl ketone, and the contents were sufficiently stirred to dissolve it. Then, 33.8 parts of isophorone diisocyanate and 14.3 parts of dimethylolpropionic acid were added to this solution to conduct a reaction for 1 hour at 75° C., thereby obtaining a solution containing a prepolymer. The resultant solution was cooled to 60° C., and an aqueous potassium hydroxide solution was added, thereby neutralizing the carboxyl group of the prepolymer. After the solution was then cooled to 40° C., ion-exchanged water was added, and the solution was stirred at high speed by a homomixer, thereby emulsifying the solution. Thereafter, 1.2 parts of ethylenediamine (chain extender) was added to conduct a chain extension reaction of the prepolymer for 12 hours at 30° C. Methyl ethyl ketone was distilled out of the solution by heating under reduced pressure at the time the presence of an isocyanate group had not been identified by FT-IR. In this manner, an aqueous water-soluble polyurethane polymer solution PU-2 (acid value: 60 mg KOH/g, weight-average molecular weight: 15,000) in which the content of the polymer was 20.0% was obtained.

Preparation of Ink:
Preparation of Inks 1 to 26

The above-obtained pigment dispersion and aqueous water-soluble polyurethane polymer solutions were mixed with the following respective components in the combinations shown in Table 1. Incidentally, "Balance" of ion-exchanged water means such an amount that the total amount of all the components constituting an ink amounts to 100.0 mass %. When two kinds of surfactants were used in an ink, they are called a first surfactant and a second surfactant, respectively.

| | |
|---|---|
| Pigment dispersion (pigment content: 10.0 mass %) | 30.0 mass % |
| Aqueous water-soluble polyurethane polymer Solution (polymer content: 20.0 mass %) | see Table 1 |
| Surfactant | see Table 1 |
| Glycerol | 15.0 mass % |
| Ethylene glycol | 5.0 mass % |
| PROXEL GXL (mildewproofing agent, product of Avecia) | 0.3 mass % |
| Ion-exchanged water | Balance. |

After these respective components were sufficiently stirred and dispersed, the resultant dispersions were filtered under pressure through a microfilter (product of Fuji Photo Film Co., Ltd.) having a pore size of 3.0 μm to prepare respective inks. Incidentally, abbreviations in Table 1 are as follows.

Ethylene Oxide-Propylene Oxide Type Surfactant
L31: ADEKA PLURONIC L31 (product of ADEKA)
L61: ADEKA PLURONIC L61 (product of ADEKA)
L68: ADEKA PLURONIC L68 (product of ADEKA)
L23: ADEKA PLURONIC L23 (product of ADEKA)
F88: ADEKA PLURONIC F88 (product of ADEKA)
Polyethylene Oxide Alkyl Ether
BC-20: NIKKOL BC-20 (product of NIKKO CHEMICALS)
BO-50: NIKKOL BO-50 (product of NIKKO CHEMICALS)
BB-30: NIKKOL BB-30 (product of NIKKO CHEMICALS)
EMALEX 750: EMALEX 750 (product of Nihon-Emulsion)
EMALEX 117: EMALEX 117 (product of Nihon-Emulsion)
EMALEX 712: EMALEX 712 (product of Nihon-Emulsion)
Other Water-Soluble Organic Compound
PEG: Polyethylene glycol
TEGmBE: Triethylene glycol monobutyl ether.

TABLE 1

Preparation conditions and properties of ink

| | Aqueous water-soluble polyurethane polymer solution (polymer content: 20 mass %) | | First surfactant | | | | | Second surfactant | | | | Content of first surfactant/ content of second surfactant (fold) | Content of first surfactant/ content of polyurethane polymer (fold) |
|---|---|---|---|---|---|---|---|---|---|---|---|---|---|
| | | Content | | General formula (1) | | | | Content | | Number of carbon atoms of alkyl group | HLB value | Content (mass %) | | |
| Ink No. | Kind | (mass %) | Kind | n | m | n/(n + m) | Mw | (mass %) | Kind | | | | | |
| Ink 1 | PU-1 | 5.00 | L31 | 3.4 | 16.4 | 0.17 | 1100 | 0.75 | BC-20 | 16 | 15.7 | 0.50 | 1.5 | 0.75 |
| Ink 2 | PU-1 | 5.00 | L31 | 3.4 | 16.4 | 0.17 | 1100 | 0.40 | BC-20 | 16 | 15.7 | 0.50 | 0.8 | 0.40 |
| Ink 3 | PU-1 | 5.00 | L31 | 3.4 | 16.4 | 0.17 | 1100 | 1.00 | BC-20 | 16 | 15.7 | 0.50 | 2.0 | 1.00 |
| Ink 4 | PU-1 | 5.00 | L31 | 3.4 | 16.4 | 0.17 | 1100 | 0.40 | BC-20 | 16 | 15.7 | 1.00 | 0.4 | 0.40 |
| Ink 5 | PU-1 | 5.00 | L31 | 3.4 | 16.4 | 0.17 | 1100 | 1.00 | BC-20 | 16 | 15.7 | 0.10 | 10.0 | 1.00 |
| Ink 6 | PU-1 | 5.00 | L61 | 5.7 | 30.2 | 0.16 | 2000 | 0.75 | BC-20 | 16 | 15.7 | 0.50 | 1.5 | 0.75 |
| Ink 7 | PU-1 | 5.00 | L68 | 150.0 | 30.2 | 0.83 | 8350 | 0.75 | BC-20 | 16 | 15.7 | 0.50 | 1.5 | 0.75 |
| Ink 8 | PU-1 | 5.00 | L31 | 3.4 | 16.4 | 0.17 | 1100 | 0.75 | EMALEX 750 | 12 | 18.4 | 0.50 | 1.5 | 0.75 |
| Ink 9 | PU-1 | 10.00 | L31 | 3.4 | 16.4 | 0.17 | 1100 | 0.40 | BC-20 | 16 | 15.7 | 0.50 | 0.8 | 0.20 |
| Ink 10 | PU-1 | 11.00 | L31 | 3.4 | 16.4 | 0.17 | 1100 | 0.40 | BC-20 | 16 | 15.7 | 0.50 | 0.8 | 0.18 |
| Ink 11 | PU-1 | 0.50 | L31 | 3.4 | 16.4 | 0.17 | 1100 | 1.00 | BC-20 | 16 | 15.7 | 0.50 | 2.0 | 10.00 |
| Ink 12 | PU-1 | 0.45 | L31 | 3.4 | 16.4 | 0.17 | 1100 | 1.00 | BC-20 | 16 | 15.7 | 0.50 | 2.0 | 11.11 |
| Ink 13 | PU-1 | 5.00 | L31 | 3.4 | 16.4 | 0.17 | 1100 | 0.75 | EMALEX 117 | 16 | 15.1 | 0.50 | 1.5 | 0.75 |
| Ink 14 | PU-1 | 5.00 | L31 | 3.4 | 16.4 | 0.17 | 1100 | 0.75 | EMALEX 712 | 12 | 14.8 | 0.50 | 1.5 | 0.75 |
| Ink 15 | PU-1 | 5.00 | L31 | 3.4 | 16.4 | 0.17 | 1100 | 0.75 | BO-50 | 18 | 17.8 | 0.50 | 1.5 | 0.75 |
| Ink 16 | PU-1 | 5.00 | L31 | 3.4 | 16.4 | 0.17 | 1100 | 0.75 | BB-30 | 22 | 16.2 | 0.50 | 1.5 | 0.75 |
| Ink 17 | PU-2 | 5.00 | L31 | 3.4 | 16.4 | 0.17 | 1100 | 0.75 | BC-20 | 16 | 15.7 | 0.50 | 1.5 | 0.75 |
| Ink 18 | PU-1 | 5.00 | L31 | 3.4 | 16.4 | 0.17 | 1100 | 0.40 | BC-20 | 16 | 15.7 | 1.20 | 0.3 | 0.40 |
| Ink 19 | PU-1 | 5.00 | L31 | 3.4 | 16.4 | 0.17 | 1100 | 1.00 | BC-20 | 16 | 15.7 | 0.08 | 12.5 | 1.00 |
| Ink 20 | PU-1 | 5.00 | L23 | 6.8 | 12.1 | 0.36 | 950 | 0.75 | BC-20 | 16 | 15.7 | 0.50 | 1.5 | 0.75 |
| Ink 21 | PU-1 | 5.00 | F88 | 194.3 | 38.8 | 0.83 | 10800 | 0.75 | BC-20 | 16 | 15.7 | 0.50 | 1.5 | 0.75 |
| Ink 22 | PU-1 | 5.00 | PEG | — | — | — | 1000 | 0.75 | BC-20 | 16 | 15.7 | 0.50 | 1.5 | 0.75 |
| Ink 23 | PU-1 | 5.00 | L31 | 3.4 | 16.4 | 0.17 | 1100 | 0.75 | TEGmBE | 4 | — | 0.50 | 1.5 | 0.75 |
| Ink 24 | PU-1 | 5.00 | L31 | 3.4 | 16.4 | 0.17 | 1100 | 0.75 | — | — | — | 0 | — | 0.75 |
| Ink 25 | PU-1 | 5.00 | — | — | — | — | — | 0 | BC-20 | 16 | 15.7 | 0.50 | 0 | — |
| Ink 26 | — | 0 | L31 | 3.4 | 16.4 | 0.17 | 1100 | 0.75 | BC-20 | 16 | 15.7 | 0.50 | 1.5 | — |

Preparation of Ink 27

Ink 27 was prepared with reference to Example 1 of Patent Literature 4 (Japanese Patent Application Laid-Open No. 2010-018741). A mixture of 20.0 parts of carbon black (trade name: Monarch (M) 1000, product of Cabot), 12.0 parts of a polymer dispersant (trade name: BYK190, product of BYK Japan) and 68.0 parts of ion-exchanged water was treated by a Nano mill in which the packing rate of zirconia beads having a diameter of 0.5 mm was set to 80%, thereby preparing a pigment dispersion having a pigment content of 20 mass %. Fifteen parts of the resultant pigment dispersion, 10.0 part of a water-soluble polyurethane polymer (trade name: SF126, product of DAI-ICHI KOGYO SEIYAKU), 30.0 parts of diethylene glycol methyl ethyl ether, 0.2 parts of a silicone compound (trade name: FZ-2105, product of Dow Corning Toray), 0.4 parts of a stabilizer (trade name: ADEKA PLURONIC F-108, product of ADEKA) and 44.4 parts of ion-exchanged water were mixed, sufficiently stirred and dispersed, and the resultant dispersion was then filtered under pressure through a microfilter (product of Fuji Photo Film Co., Ltd.) having a pore size of 3.0 μm to prepare Ink 27.

Evaluation:

In the present invention, in the evaluation criteria of the following respective evaluations, A to B were regarded as a favorable level, and C was regarded as an unacceptable level. Each of the following evaluations was made by using an ink jet recording apparatus (trade name: PIXUS Pro 9500 (manufactured by Canon Inc.) equipped with a recording head for ejecting an ink by the action of thermal energy. In the ink jet recording apparatus, an image recorded under conditions where resolution is 600 dpi×600 dpi, and 8 ink droplet each of which is 3.5 ng are applied to a unit region of 1/600 inch×1/600 inch is defined as "recording duty being 100%".

Ejection Stability of Ink

Each ink obtained above was charged into an ink cartridge, and the ink cartridge was installed in the ink jet recording apparatus. After a solid image (an image whose recording duty was 100%) was continuously recorded on sheets of glossy paper (trade name: Canon Photo Paper•Gloss Gold GL-101; product of Canon Inc.), and a nozzle-check pattern of the ink jet recording apparatus was recorded on a plain paper sheet (trade name: PB PAPER GF-500, product of Canon Inc.). The resultant nozzle-check pattern was visually observed to make evaluation as to the ejection stability of the ink. The evaluation criteria as to the ejection stability of the ink is as follows. Evaluation results are shown in Table 2.
A: No disorder was observed on the nozzle-check pattern;
B: Some disorder was observed on the nozzle-check pattern, but no ejection failure occurred;
C: Disorder was clearly observed on the nozzle-check pattern, and ejection failure occurred.

Glossiness of Image

Each ink obtained above was charged into an ink cartridge, and the ink cartridge was installed in the ink jet recording apparatus. An image with the recording duty thereof changed between 10% and 180% in an increment of 10% was recorded on glossy paper (trade name: Canon Photo Paper•Gloss Gold GL-101; product of Canon Inc.) and naturally dried for 24 hours. Thereafter, two fluorescent lamps arranged at an interval of 10 cm were projected on an image portion whose recording duty was 100% of the above-described image from a distance of 2 m away under conditions where the illuminating angle is 45°, and the shapes of the fluorescent lamps projected on the image were visually observed at an observation angle of 45°, thereby making evaluation as to the glossiness of the image. The evaluation criteria as to the glossiness of the image is as follows. Evaluation results are shown in Table 2.
A: The two fluorescent lamps were clearly projected on the image;
B: Edge portions of the two fluorescent lamps projected were somewhat blurred;
C: A boundary line between the two fluorescent lamps projected was not recognized.

Optical Density of Image

Optical densities of the respective recording duty portions (10% to 150%) of the image obtained in the above-described evaluation of Glossiness of image were measured by means of a reflective densitometer (trade name: RD-191, manufactured by Gretag Macbeth). Evaluation of the optical density of the image was made from the maximum value of the resultant optical densities. The evaluation criteria as to the optical density of the image is as follows. Evaluation results are shown in Table 2.
A: The maximum value of the optical densities was more than 2.2;
B: The maximum value of the optical densities was more than 2.0 and 2.2 or less;
C: The maximum value of the optical densities was 2.0 or less.

TABLE 2

| | | Evaluation results | | |
|---|---|---|---|---|
| | | Evaluation result | | |
| Example No. | Ink No. | Ejection stability of ink | Glossiness of image | Optical density of image |
| Example 1 | Ink 1 | A | A | A |
| Example 2 | Ink 2 | A | A | A |
| Example 3 | Ink 3 | A | A | A |
| Example 4 | Ink 4 | A | A | A |
| Example 5 | Ink 5 | A | A | A |
| Example 6 | Ink 6 | A | A | A |
| Example 7 | Ink 7 | A | A | A |
| Example 8 | Ink 8 | A | A | A |
| Example 9 | Ink 9 | A | A | A |
| Example 10 | Ink 10 | B | A | A |
| Example 11 | Ink 11 | A | A | A |
| Example 12 | Ink 12 | A | B | B |
| Example 13 | Ink 13 | A | A | A |
| Example 14 | Ink 14 | A | B | B |
| Example 15 | Ink 15 | A | A | A |
| Example 16 | Ink 16 | A | B | B |
| Example 17 | Ink 17 | A | B | A |
| Comparative Example 1 | Ink 18 | C | A | A |
| Comparative Example 2 | Ink 19 | A | C | C |
| Comparative Example 3 | Ink 20 | C | A | A |
| Comparative Example 4 | Ink 21 | C | A | A |
| Comparative Example 5 | Ink 22 | C | A | A |
| Comparative Example 6 | Ink 23 | C | C | C |
| Comparative Example 7 | Ink 24 | C | C | C |
| Comparative Example 8 | Ink 25 | C | C | C |
| Comparative Example 9 | Ink 26 | C | C | C |
| Comparative Example 10 | Ink 27 | C | C | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-129095, filed Jun. 6, 2012, which is hereby incorporated by reference herein in its entirety.

What is claimed is:

1. An ink for use in an ink jet recording process in which an ink is ejected from a recording head by the action of thermal energy, the ink comprising:
   a pigment;
   a water-soluble polyurethane polymer;
   a compound represented by the following general formula (1) and having a weight-average molecular weight of 1,000 or more and 8,500 or less; and
   a polyethylene oxide alkyl ether, the alkyl group of which has 12 or more carbon atoms, General formula (1)

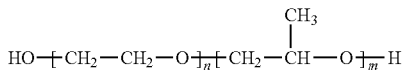

$$HO\text{---}(CH_2\text{---}CH_2\text{---}O)_n\text{---}(CH_2\text{---}CH(CH_3)\text{---}O)_m\text{---}H$$

wherein n is 3 or more and 38 or less, m is 16 or more and 56 or less, and n/(n+m) is 0.15 or more and 0.85 or less,
wherein, based on the total mass of the ink, the content (mass %) of the compound represented by the general formula (1) is from 0.40 to 1.00, and
wherein, based on the total mass of the ink, the content (mass %) of the polyethylene oxide alkyl ether is from 0.10 to 1.20.

2. The ink according to claim 1, wherein the HLB value of the polyethylene oxide alkyl ether is 15.0 or more.

3. The ink according to claim 1, wherein the number of carbon atoms of the alkyl group of the polyethylene oxide alkyl ether is 18 or less.

4. The ink according to claim 1, wherein the water-soluble polyurethane polymer has a unit derived from neopentyl glycol.

5. An ink cartridge comprising an ink storage portion storing an ink, wherein the ink stored in the ink storage portion is the ink according to claim 1.

6. An ink jet recording process comprising ejecting an ink from a recording head by the action of thermal energy, wherein the ink is the ink according to claim 1.

7. The ink according to claim 1, wherein, based on the total mass of the ink, the content (mass %) of the compound represented by the general formula (1) is from 0.75 to 1.00.

8. The ink according to claim 1, wherein, based on the total mass of the ink, the content (mass %) of the compound represented by the general formula (1) is 0.4 times or more and 10.0 times or less in terms of mass ratio with respect to the content (mass %) of the polyethylene oxide alkyl ether.

9. The ink according to claim 1, wherein, based on the total mass of the ink, the content (mass %) of the compound represented by the general formula (1) is 0.2 times or more and 10.0 times or less in terms of mass ratio with respect to the content (mass %) of the water-soluble polyurethane polymer.

10. The ink according to claim 1, wherein, based on the total mass of the ink, the content (mass %) of the polyethylene oxide alkyl ether is from 0.10 to 1.00.

11. The ink according to claim 1, wherein, based on the total mass of the ink, the content (mass %) of the pigment is from 0.1 to 15.0.

12. The ink according to claim 1, wherein, based on the total mass of the ink, the content (mass %) of the water-soluble polyurethane polymer is from 0.1 to 10.0.

13. The ink according to claim 1, wherein the ink further comprises a polymer dispersant for dispersing the pigment.

14. The ink according to claim 13, wherein, based on the total mass of the ink, the content (mass %) of the polymer dispersant is from 0.1 to 10.0.

15. The ink according to claim 13, wherein, based on the total mass of the ink, the content (mass %) of the polymer dispersant is 0.1 times or more and 1.0 times or less in terms of mass ratio with respect to the content (mass %) of the pigment.

16. The ink according to claim 1, wherein, based on the total mass of the ink, the content (mass %) of the water-soluble polyurethane polymer is 0.03 times or more and 1.00 times or less in terms of mass ratio with respect to the content (mass %) of the pigment.

17. The ink according to claim 1, wherein the pigment is a carbon black or an organic pigment.

18. The ink according to claim 1, wherein the pigment is a carbon black.

* * * * *